United States Patent Office 3,173,854
Patented Mar. 16, 1965

3,173,854
CATALYTIC HYDROCRACKING WITH A CRYSTALLINE ZEOLITE CONTAINING HYDROGENATION METALS AND A RARE EARTH
Sylvander C. Eastwood, Woodbury, Richard J. Kelly, Pittman, and Stephen J. Wantuck, Collingswood, N.J., assignors to Socony Mobil Oil Company, Inc., a corporation of New York
No Drawing. Filed Mar. 8, 1961, Ser. No. 94,147
15 Claims. (Cl. 208—111)

This invention relates to an improved hydrocracking process. More particularly, the present invention is directed to a process for hydrocracking a hydrocarbon oil by subjecting the same to contact in the presence of hydrogen under hydrocracking conditions with an unusual catalyst characterized by exceptional activity and selectivity. The invention is further directed to such catalyst and to the manufacture thereof.

Hydrocracking operations have heretofore been proposed in which there is employed a catalyst comprising one or more components exhibiting hydrogenation activity, such as the metals of Groups VI and VIII of the Periodic Table either in elemental form or in the form of the oxides or sulfides of these metals. Such components have been deposited by impregnation on alumina and silica-alumina supports. While such type catalyst has proved to be fairly satisfactory, it is subject to improvement particularly in regard to its ability to afford a high yield of useful product with a concomitant small yield of undesirable product.

In accordance with the present invention, there has now been discovered a catalyst possessing unusual activity and selectivity in the hydrocracking of petroleum hydrocarbons. The catalyst of the present invention comprises a hydrogenation component and, particularly, one selected from the group consisting of oxides of metals, sulfides of metals and metals of Groups VI and VIII of the Periodic Table in intimate combination with a rare earth metal aluminosilicate, resulting from base-exchange of a crystalline alkali metal aluminosilicate having uniform pore openings between 6 and 15 Angstrom units with rare earth metal ions to replace at least about 75 percent of the original alkali metal content of said alkali metal aluminosilicate with said ions and to effectively reduce the alkali metal content of the resulting composite to below 4 percent by weight, washing the base-exchanged material free of soluble salts, drying and thereafter thermally activating the product by heating at a temperature in the approximate range of 500° F. to 1500° F. for a period of between about 1 and about 48 hours.

In one embodiment, the present invention affords a process for hydrocracking a hydrocarbon charge by contacting the same in the presence of hydrogen under hydrocracking conditions with a catalyst comprising a hydrogenation component selected from the group consisting of oxides of metals, sulfides of metals, and metals of Groups VI and VIII of the Periodic Table in intimate combination with a rare earth metal aluminosilicate, resulting from base-exchange of a crystalline alkali metal aluminosilicate having uniform pore openings between 6 and 15 Angstrom units with rare earth metal ions to replace at least about 75 percent of the original alkali metal content of the alkali metal aluminosilicate with said ions and to effectively reduce the alkali metal content of the resulting composite to below 4 percent by weight, washing the base-exchanged material free of soluble salts, drying and thereafter thermally activating the product by heating at a temperature in the approximate range of 500° F. to 1500° F. for a period of between about 1 and about 48 hours.

In another embodiment, the present invention provides a process for effecting hydrocracking of a hydrocarbon charge by contacting the same with a catalyst having exceptional activity and selectivity prepared by contacting a crystalline alkali metal aluminosilicate zeolite having uniform pore openings between 6 and 15 Angstrom units with a solution of rare earth metal ions to effect base-exchange of at least about 75 percent of the alkali metal ions of said zeolite with the aforesaid rare earth metal ions and to effectively reduce the content of alkali metal of the resulting composite to below 4 percent by weight, washing the base-exchanged material free of soluble salts, drying and thermally activating the washed product by heating to a temperature in the approximate range of 500 to 1500° F. to effect at least partial conversion of the metal ion introduced by base-exchange to a catalytically active state and impregnating the resulting rare earth metal aluminosilicate with between about 0.01 and about 25 percent by weight of a hydrogenation component selected from the group consisting of oxides of metals, sulfides of metals, and metals of Groups VI and VII of the Periodic Table.

Another embodiment of the invention affords a process for hydrocracking a hydrocarbon oil by contacting the same in the presence of hydrogen under hydrocracking conditions with a catalyst consisting essentially of a hydrogenation component selected from the group consisting of oxides of metals, sulfides of metals and metals of Groups VI and VIII of the Periodic Table combined with a rare earth metal aluminosilicate resulting from contact with a crystalline alkali metal aluminosilicate zeolite having uniform pore openings between 6 and 15 Angstrom units with a solution of an ionizable rare earth metal compound to replace, by base-exchange, at least 90 percent of the alkali metal content of the zeolite with rare earth metal ions and to effectively reduce the alkali metal content thereof below about 1 percent by weight, washing the base-exchanged material free of soluble salts, drying and thermally activating the washed product by heating to a temperature in the approximate range of 500° F. to 1500° F. for a period of between about 1 and about 48 hours.

In still another embodiment, the invention provides an improved hydrocracking catalyst consisting essentially of a hydrogenation component selected from the group consisting of oxides of metals, sulfides of metals and metals of Groups VI and VIII of the Periodic Table intimately combined with a rare earth metal aluminosilicate resulting from contact with a crystalline alkali metal aluminosilicate zeolite having uniform pore openings between 6 and 15 Angstrom units with a solution of an ionizable rare earth metal compound to replace, by base-exchange, at least 75 percent and, preferably, at least 90 percent of the alkali metal content of the zeolite with rare earth metal ions and to effectively reduce the alkali metal content thereof below about 4 and, preferably, below about 1 percent by weight, washing the base-exchanged material free of soluble salts, drying and thermally activating the washed product by heating to a temperature in the approximate range of 500° F. to 1500° F. for a period of between about 1 and about 48 hours.

In a still further embodiment, the invention resides in a method for making a hydrocracking catalyst by base-exchanging a crystalline alkali metal aluminosilicate zeolite having uniform pore openings between 6 and 15 Angstrom units with a solution of an ionizable rare earth metal compound to replace, by base-exchange, at least about 75 percent and, preferably, at least 90 percent of the alkali metal content of the zeolite with rare earth metal ions and to effectively reduce the alkali metal content thereof below about 4 and, preferably below about 1 percent by weight, washing the base-exchanged material free of soluble anions, drying and thermally activating the washed product by heating to a temperature in the approximate range of 500° F. to 1200° F. for a period of between about 1 and about 48 hours and intimately combining with the resulting rare earth metal aluminosilicate, a hydrogenation component selected from the group consisting of oxides of metals, sulfides of metals and metals of Groups VI and VIII of the Periodic Table.

The crystalline alkali metal aluminosilicates employed in the preparation of the catalysts described herein are zeolites. Such substances have been generally described by Barrer in several publications and in U.S. 2,306,610 and U.S. 2,413,134. These materials are essentially the dehydrated forms of crystalline, natural or synthetic hydrous siliceous zeolites containing varying quantities of alkali metal, silicon and aluminum with or without other metals. The alkali metal atoms, silicon, aluminum and oxygen in these zeolites are arranged in the form of an aluminosilicate salt in a definite and consistent crystalline pattern. The structure contains a large number of small cavities interconnected by a number of still smaller holes or channels. These cavities and channels are precisely uniform in size. The alkali metal aluminosilicate zeolite used in preparation of the catalysts described herein has a uniform pore structure comprising openings characterized by an effective pore diameter of between 6 and 15 Angstroms. A typical commercially available zeolite fulfilling the above requirements is the X type zeolite and, specifically, 13X zeolite marketed by the Linde Division of Union Carbide Corporation and described in U.S. 2,882,244.

In general, the process for preparing such alkali metal aluminosilicates involves heating, in aqueous solution, an appropriate mixture of oxides or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibruim with the zeolite has a pH in the range of 9 to 12 and, thereafter, is dehydrated by heating. Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While it is contemplated that alkali metal aluminosilicates having the above-designated pore characteristics may be employed in preparation of the described catalysts, it is generally preferred to use a sodium aluminosilicate. Thus, assuming sodium as the alkali metal, the reaction mixture should contain a molar ratio of $Na_2O/SiO_2$ of at least 0.5/1 and, generally, not in excess of 2/1. Sodium aluminate having a molar ratio of $Na_2O/Al_2O_3$ in the range of 1/1 to 3/1 may be employed. The amounts of sodium silicate solution and sodium aluminate solution are such that the molar ratio of silica to alumina in the final mixture is at least 2.2/1. Preferably, the solution has a composition expressed as mixtures of oxides within the following ranges: $SiO_2/Al_2O_3$ of 3 to 5, $Na_2O/SiO_2$ of 1.2 to 1.5 and $H_2O/Na_2O$ of 35 to 60. The reaction mixture is placed in a suitable vessel which is closed to the atmosphere in order to avoid losses of water and reagents are then heated for an appropriate length of time. A convenient and generally employed process for making the sodium aluminosilicate reactant involves reaction of aqueous solutions of sodium aluminate and sodium silicate to which may be added sodium hydroxide. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reactant any longer in order to obtain a maximum yield of crystals.

After formation, the crystalline zeolite is separated from the mother liquor usually by filtration. The crystalline mass is then washed, preferably with water and while on the filter until the wash water in equilibrium with the zeolite reaches a pH of 9 to 12.

The catalysts utilized in the present process are prepared by base-exchanging a crystalline alkali metal aluminosilicate such as described hereinabove having a structure of rigid three-dimensional networks characterized by a uniform pore diameter between 6 and 15 Angstrom units with rare earth metal ions and thereafter washing the base-exchanged material free of soluble salts, drying the washed composite and subjecting the same to a thermal activating treatment.

The base-exchange solutions employed may be contacted with the crystalline zeolite of uniform pore structure as formed, after washing free of soluble salts or in the form of a fine powder, a compressed pellet, extruded pellet, or other suitable particle shape. When in the form of a pellet the crystalline zeolite may be combined with a binder such as clay. It has been established that the desired base-exchange may be effected most readily for the alkali metal aluminosilicate zeolite undergoing treatment which has not previously been subjected to a temperature above about 600° F.

Base-exchange required for introducing the aforementioned rare earth metal ions may be accomplished by contacting the alkali metal aluminosilicate zeolite for a sufficient period of time and under appropriate temperature conditions to replace at least about 75 percent and, preferably, at least about 90 percent of the alkali metal contained in the aluminosilicate zeolite with ions of rare earth metal to effectively reduce the content of alkali metal of the resulting composite to below 4 weight percent and preferably less than 1 weight percent.

It is contemplated that any of the readily available rare earth metal compounds may be employed for the above purpose. Generally, compounds will be used wherein the rare earth metal-containing ion is present in the cationic state. Representative rare earth metal compounds include nitrates, bromides, acetates, chlorides, iodides and sulfates of one or more of the rare earth metals including cerium, lanthanum, praseodymium, neodymium, samarium, europium, gadolinium, terbium, dysprosium, holmium, erbium, thulium, ytterbium, and lutetium. Naturally occurring rare earth minerals offer a convenient source for the rare earth metals. The natural rare earth metal-containing mineral may be extracted with an acid such as sulfuric, or rare earth oxides and related metal oxides in admixture from a natural earth may be dissolved in other solubilizing acids such as acetic. For example, monazite which contains cerium compounds as the principal rare earth metal compound present with lesser portions of thorium compounds and other rare earth compounds may be used as a suitable source of cerium. Mixtures of rare earth metal salts, for example, chlorides of lanthanum, cerium, praseodymium, neodymium, samarium and gadolinium available commercially at a relatively low cost may be effectively employed.

While water will ordinarily be the solvent in the base-exchange solutions used, it is contemplated that other solvents, although generally less preferred, may be used; in which case, it will be realized that the above list of representative rare earth metal compounds may be expanded. Thus, in addition to aqueous solutions, alcoholic solutions, etc. of the rare earth metal-containing compounds may be employed in producing the catalyst utilized in the present process. It will be understood that such rare earth metal compounds employed undergo ionization in the particular solvent used.

The concentration of rare earth metal compound employed in the base-exchange solutions may vary depending on the alkali metal aluminosilicate undergoing treatment and on the conditions under which treatment is effected. The overall concentrations of replacing metal ions, however, is such as to reduce the alkali metal content of the original alkali metal aluminosilicate to less than 4, and preferably, less than 1 weight percent. In base-exchanging the alkali metal aluminosilicate with a solution of a rare earth metal compound generally the concentration of such compound is within the range of 1 to 30 percent by weight. The pH of such exchange solution is generally within the approximate range of 3.5 to 6.5 and, preferably, between about 4 and about 5.5.

The temperature at which base-exchange is effected may vary widely, generally ranging from room temperature to an elevated temperature below the boiling point of the treating solution. The volume of base-exchange solution employed in any instance may vary widely. Generally, however, an excess is employed and such excess is removed from contact with the crystalline aluminosilicate zeolite after a suitable period of contact. The time of contact between the base-exchange solution and crystalline zeolite in any instance is such as to effect substantial replacement of the alkali metal ions thereof with rare earth metal ions. It will be appreciated that such period of contact may vary widely depending on the temperature of the solution, the nature of the alkali metal aluminosilicate used and the particular rare earth metal compounds employed. Thus, the time of contact may extend from a brief period of the order of a few hours for small particles to longer periods of the order of days for large pellets. The exchange may also be carried out with several batches of solution wherein contact time per batch may range from about ½ hour to 2 hours. Generally, the total time of contact will, depending on the various aforementioned factors, be within the range of ½ hour to 80 hours.

After the base-exchange treatment, the product is removed from the treating solution. Anions introduced as a result of treating with the rare earth metal base exchange solutions are removed by water-washing the treated composite for such period of time until the same is free of said anions. The washed product is then dried, generally in air to remove substantially all of the water therefrom. While drying may be effected at ambient temperature, it is generally more satisfactory to facilitate the removal of moisture by maintaining the product at a temperature between about 150 and about 600° F. for 4 to 48 hours.

The dried material is then essentially subjected to an activating treatment which entails heating the dried material generally in air to a temperature within the approximate range of 500° F. to 1500° F. for a period of between 1 and 48 hours. The resulting product has a surface area within an approximate range of 50 to 600 square meters per gram and generally contains between about 0.1 and about 30 weight percent of rare earth metal, between about 0.1 and about 4 weight percent alkali metal, between about 25 and about 40 weight percent alumina and between about 40 and about 60 weight percent silica.

The above rare earth metal aluminosilicate is intimately combined with a component exhibiting hydrogenation activity. Suitable hydrogenation components include one or more of the metals of Groups VI and VIII of the Periodic Table either in elemental form or in the form of the oxides or sulfides of these metals. Representative of these metals are molybdenum, chromium, tungsten, iron, cobalt, nickel, and metals of the platinum group, i.e. platinum, palladium, osmium, rhodium, ruthenium and iridium as well as combinations of these metals, their oxides or sulfides. Thus, a particularly desirable combination of metal oxides is that of the oxides of cobalt and molybdenum intimately combined with the above-described rare earth metal aluminosilicate such as by being impregnated thereon.

Combination of one or more of the above-indicated hydrogenation components with the rare earth metal aluminosilicate may take place in any feasible manner, for example, by impregnating the rare earth metal aluminosilicate by contacting the same with solutions containing ions of the appropriate hydrogenation component which it is desired to introduce. In this manner, a hydrogenation component can be introduced by deposition of the incoming metal on the rare earth metal exchanged aluminosilicate, after removal of the impregnating solution from the rare earth metal aluminosilicate carrier. The hydrogenation component may also be combined with the rare earth metal aluminosilicate by utilizing a mixed base technique wherein the base containing the hydrogenation component, for example, cobalt oxide-molybdenum oxide on alumina is admixed in finely divided form with the rare earth metal aluminosilicate. In such mechanical mixtures, the particle size of each of the components making up such mixture is generally less than about 100 microns in diameter. Another method of introducing the hydrogenation component involves its exchange into the aluminosilicate structure. Other means for combining the rare earth metal exchanged aluminosilicate with the hydrogenation component are feasible such as for example, the addition of the hydrogenation component to a slurry of the aluminosilicate.

The amount of hydrogenation component combined with the rare earth metal aluminosilicate may vary widely and will depend on the charge stock undergoing hydrocracking as well as on the particular nature of the hydrogenation component. Generally, the amount of hydrogenation component will be within the range of about 0.01 to 25 percent by weight. When a metal of the platinum series is employed, the amount thereof will generally range from about 0.01 to 5 weight percent. With other hydrogenation components such as the oxides or sulfides of molybdenum, cobalt, tungsten, chromium, iron, and nickel, the amounts employed will generally be within the approximate range of 2 to 25 weight percent. Thus, when the hydrogenation component is a combination of cobalt oxide and molybdenum oxide, the cobalt oxide content is generally in the approximate range of 1 to 4 weight percent and the molybdenum oxide is within the range of 5 to 15 weight percent. It will be understood that in any instances, the amount of hydrogenation component present will be such as to afford a resulting composite in combination with the rare earth metal aluminosilicate of a hydrocracking catalyst characterized by unusual activity and selectivity.

Hydrocarbon charge stocks undergoing hydrocracking in accordance with this invention comprise hydrocrackable hydrocarbons generally and, particularly, petroleum fractions having an initial boiling point of at least about 400° F., a 50 percent point of at least about 500° F. and an end point of at least about 600° F. Such hydrocarbon fractions include gas oils, residual oils, cycle stocks, whole topped crudes and heavy hydrocarbon fractions derived by the destructive hydrogenation of coal, tars, pitches, asphalts and the like. As will be recognized, the distillation of higher boiling petroleum fractions above about 750° F. must be carried out under vacuum in order to avoid thermal cracking. The boiling temperatures utilized herein are expressed in terms for convenience of the boiling point corrected to atmospheric pressure.

Hydrocracking, in accordance with the present process, is generally carried out at a temperature between about 400° F. and about 950° F. The hydrogen pressure in such operation is generally within the range of about 100 and about 3000 p.s.i.g. and, preferably, about 350 to about 2000 p.s.i.g. The liquid hourly space velocity, i.e. the liquid volume of hydrocarbon per hour per volume of catalyst is between about 0.1 and about 4. In general, the molar ratio of hydrogen to hydrocarbon charge employed is between about 2 and about 80, and preferably, between about 5 and about 50.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein. After hydrocracking, the resulting products may suitably be separated from the remaining components by conventional means such as adsorption, distillation, etc. Also, the catalyst after use over an extended period of time may be regenerated in accordance with conventional procedures by burning off carbonaceous deposit from the surface of the catalyst in an oxygen-containing atmosphere under conditions of elevated temperature.

The following examples will serve to illustrate the catalyst and process of the invention without limiting the same:

EXAMPLE 1

A crystalline sodium aluminosilicate having a uniform pore structure comprising openings characterized by an effective pore diameter in the range of 6 to 15 Angstroms was prepared by the addition of 199 parts by weight of an aqueous solution of sodium aluminate, containing the equivalent of 43.5 weight percent alumina ($Al_2O_3$) and 30.2 weight percent sodium oxide ($Na_2O$) to 143 parts by weight of aqueous sodium silicate solution, containing the equivalent of 26.5 weight percent silica ($SiO_2$) and 8.8 weight percent sodium oxide ($Na_2O$). The gel which formed on mixing the two above solutions was broken by vigorous mixing. The entire mass was mixed thoroughly to a cream-like consistency and, thereafter, heated without agitation for 12 hours at 205° F. At the end of this period, there was found to have formed a flocculant precipitate beneath a clear supernatant liquid. The precipitate was filtered and washed with water at room temperature until the pH of the filtrate was 11.0. The resulting aluminosilicate crystalline product, upon analysis was found to contain 21.6 mol percent $Na_2O$, 22.6 mol percent $Al_2O_3$ and 55.8 mol percent $SiO_2$ based on the dried product.

The above crystalline sodium aluminosilicate was contacted at 150° F. with 1500 cc. of an aqueous solution having a pH of 4 and containing 1.0 pound of the chlorides of a rare earth metal mixture consisting principally of cerium, lanthanum, praseodymium, neodymium, together with smaller amounts of other rare earths. The mixture was continuously agitated and after 24 hours, the solid was filtered, washed and contacted with fresh rare earth metal chloride solution as above. The above operation, during which sodium of the aluminosilicate solid was exchanged by rare earth metal, was repeated a number of times until the sodium content of the aluminosilicate had been reduced to 1.1 weight percent, corresponding to a replacement of 92 percent of the original sodium content of the crystalline aluminosilicate with rare earth metal ions. The exchanged aluminosilicate material had a rare earth metal content of 27 percent by weight, calculated as the oxides.

The product so obtained was washed, dried at 240° F., pelleted to 1/8 x 1/16 inch particles and calcined to 1000° F., in dry air. The calcined rare earth metal-exchanged aluminosilicate was then steam-treated for 10 hours at 1200° F. and a pressure of 15 p.s.i.g.

An 82 gram sample of the above pellets was then evacuated to a pressure of about 35 millimeters of mercury and contacted with 50 cc. of an aqueous solution of 11.5 grams of ammonium molybdate for 1/2 hour at room temperature. The impregnated pellets were then removed from their evacuated state, dried at 240° F. and calcined for 3 hours at 1000° F., with air flow through the pellets at 5 vol./vol. of pellets/minute. The calcined pellets were again evacuated to a pressure of about 35 millimeters of mercury and contacted with 30 cc. of an aqueous solution containing 9.0 grams of cobaltous chloride and 2.0 grams of ammonium chloride for 24 hours at room temperature. The impregnated pellets were then removed from their evacuated state, dried at 240° F., calcined for 3 hours at 1000° F. and then treated with a mixture of 50 volume per cent hydrogen and 50 volume per cent hydrogen sulfide at 800° F. The resulting product was found to contain 1.6 weight percent cobalt oxide (CoO) and 8.5 weight percent molybdenum oxide ($MoO_3$) before sulfiding, and contained 4.5 weight percent sulfur after sulfiding.

The sulfided cobalt-molybdenum on rare earth metal-exchanged aluminosilicate pellets resulting from the above preparation were employed in hydrocracking two distinct gas oil charge stocks under varying conditions of temperature, pressure and space velocity. The results obtained, together with those achieved under comparable conditions with a known effective sulfided hydrocracking catalytic composite utilized as a standard and containing 2.5 weight percent cobalt oxide, 7.9 weight percent molybdenum oxide and 15 weight percent silica before sulfiding, and 3.8 weight percent sulfur after sulfiding, with remainder alumina are shown below in Table I:

*Table I*

| Stock | West Texas 650° F. to Tar Gas Oil | | Catalytically Cracked Light Gas Oil | |
|---|---|---|---|---|
| Catalyst | Example 1 | Standard | Example 1 | Standard |
| Hydrocracking Conditions: | | | | |
| Pressure, p.s.i.g. | 2,000 | 2,000 | 1,500 | 1,500 |
| Space Vel., Vol. oil/hour/vol. cat. | 1.0 | 1.0 | 2.0 | 0.5 |
| Reaction Temp., ° F. | 777 | 830 | 778 | 850 |
| Product Distribution: | | | | |
| Conversion, percent Vol. Chg. | 57 | 55 | 68 | 68 |
| $C_3$ & Lighter, percent Wt. Chg. | 3.6 | 4.0 | 3.5 | 5.5 |
| Methane + Ethane in $C_3$ & Lighter, percent Wt. | 17 | 60 | 23 | 42 |
| Butanes, percent Vol. | 10.9 | 3.3 | 13.5 | 12.3 |
| i$C_4$, percent of Total $C_4$ | 64 | 43 | 57 | 49 |
| Pentanes, percent Vol. | 8.6 | 2.3 | 12.4 | 11.0 |
| i$C_5$, percent of Total $C_5$ | 92 | 57 | 87 | 69 |
| Naphtha: | | | | |
| 125–180° F., percent Vol. | 9.1 | 2.9 | 9.0 | 10.2 |
| 180–390° F., percent Vol. | 30.1 | 17.4 | 51.0 | 54.0 |
| Octanes, CFRR + 3 ml. TEL: | | | | |
| 125–180° F. Naphtha | | | 96 | 92 |
| 180–390° F. Naphtha | | | 95 | 87 |
| Total Liquid Prod., percent Vol. Chg. | 112.0 | 107.6 | 117.8 | 119.5 |
| Hydrogen Consumption, s.c.f./b. | 1,140 | 1,290 | 1,745 | 2,240 |

It will be evident from the foregoing data that sulfided cobalt-molybednum deposited on a rare earth metal-exchanged aluminosilicate is an exceptionally active and selective catalyst for the hydrocracking of gas oils. Thus, in hydrocracking a catalytically cracked light gas oil, the present catalyst produces a low amount of methane and ethane, high isomer content butanes and pentanes, a high yield of gasoline of an octane quality which requires no further upgrading and consumes less hydrogen as compared to other known effective hydrocracking catalysts.

EXAMPLE 2

Pellets of rare earth metal-exchanged alumino-silicate were prepared as described in Example 1. Eighty-four (84) grams of such pellets were then evacuated to a pressure of about 35 millimeters of mercury and contacted in two stages with a total of 62 cc. of an 11 percent by weight aqueous solution of ammonium tungstate, adjusted to 6.5 pH with citric acid, for ½ hour at room temperature, with drying at 240° F. for 16 hours after each stage. The impregnated pellets were then removed from their evacuated state and calcined in a nitrogen-air mixture up to 850° F. The calcined pellets were again evacuated to a pressure of about 35 millimeters of mercury and contacted with 47 cc. of an aqueous solution of 20.9 grams of nickel nitrate for 8 hours at room temperature. The impregnated pellets were then removed from their evacuated state, dried at 240° F. in air for 24 hours and calcined for 3 hours in dry air at 1000° F. The resulting composite was then sulfided at 800° F. for 5 hours with a mixture of 50 volume percent hydrogen and 50 volume percent hydrogen sulfide. The resulting product was found to contain 4.2 weight per cent nickel and 7.9 per cent tungsten before sulfiding, and 3.6 weight percent sulfur after sulfiding.

The nickel tungsten sulfide on rare earth metal-exchanged aluminosilicate pellets resulting from the above preparation were employed in hydrocracking a West Texas 650° F.-tar gas oil at a pressure of 2000 p.s.i.g., a temperature of 801° F. and a liquid hourly space velocity of 1.0. The results obtained are shown below in Table II:

*Table II*

Product distribution:
  Conversion, percent vol. chg. _____ 58
  $C_3+$ lighter, percent wt. chg. _____ 5.5
  Butanes, percent vol. chg. _____ 18.9
  $iC_4$, percent of total $C_4$ _____ 63
  Pentanes, percent vol. chg. _____ 13.7
  $iC_5$, percent of total $C_5$ _____ 88
Naphtha:
  125–180° F., percent vol. chg. _____ 8.2
  180–390° F., percent vol. chg. _____ 25.6
Total liq. prod., percent vol. chg. _____ 116.8
Hydrogen consumption, s.c.f./b. _____ 1700

The above data shows that nickel tungsten sulfide in combination with a rare earth metal-exchanged aluminosilicate is an unsually active and selective catalyst for the hydrocracking of gas oils.

EXAMPLE 3

Pellets of rare earth metal-exchanged alumino-silicate were prepared as described in Example 1. Seventy-four (74) grams of such pellets were then evacuated to a pressure of about 35 millimeters of mercury and contacted with 45 cc. of an aqeous solution of chloroplatinic acid containing 0.8 weight percent of platnium. The impregnated pellets were then removed from their evacuated state and maintained for 48–72 hours at 240° F. in their own vapor. The resulting composite was then calcined in hydrogen for 2 hours at 450° F. and, thereafter, for 2 hours at 950° F.

The catalyst pellets so prepared were employed in hydrocracking a West Texas 650° F.-tar gas oil at a pressure of 2000 p.s.i.g., a temperature of 802° F. and a liquid hourly space velocity of 1.0. The results obtained are shown below in Table III:

*Table III*

Product distribution:
  Conversion, percent vol. chg. _____ 70
  $C_3+$ lighter, percent wt. chg. _____ 3.7
  Butanes, percent vol. chg. _____ 11.9
  $iC_4$, percent of total $C_4$ _____ 64
  Pentanes, percent vol. chg. _____ 9.3
  $iC_5$, percent of total $C_5$ _____ 79
Naphtha:
  125–180° F., percent vol. chg. _____ 9.1
  180–390° F., percent vol. chg. _____ 37.4
Total liq. prod., percent vol. chg. _____ 115.0
Hydrogen consumption, s.c.f./b. _____ 1460

The foregoing data shows that platinum combined with a rare earth metal-exchanged aluminosilicate is an unusually active and selective catalyst for the hydrocracking of gas oils.

It will be evident from the compositions and catalytic hydrocracking results described herein that improved hydrocracking catalysts are afforded by the intimate combination of a hydrogenation component with an initially crystalline alkali metal aluminosilicate having a uniform pore structure with openings in the range of 6 to 15 Angstrom units and base-exchanged with a rare earth metal. It will thus be understood that the above description is merely illustrative of preferred embodiments of the invention, of which many variations may be made by those skilled in the art without departing from the spirit thereof.

We claim:

1. A catalytic composition comprising a crystalline aluminosilicate, at least 75 percent of the metal cation content of which is rare earth metal introduced by base exchange and which has impregnated thereon a minor proportion of a component characterized by hydrogenation activity selected from the group consisting of oxides of metals, sulfides of metals and metals of Group VI, Group VIII and mixtures of Groups VI and VIII of the Periodic Table.

2. A catalytic composition comprising a crystalline aluminosilicate, at least 90 percent of the metal cation content of which is rare earth metal introduced by base exchange and which has impregnated thereon a minor proportion of a hydrogenation component selected from the group consisting of oxides of metals, sulfides of metals and metals of Group VI, Group VIII and mixtures of Groups VI and VIII of the Periodic Table.

3. A catalytic composition consisting essentially of a crystalline aluminosilicate having uniform pore openings between 6 and 15 Angstrom units and containing between about 0.1 and about 30 weight percent of rare earth metal introduced by base exchange, between about 0.1 and about 40 weight percent alkali metal, between about 25 and about 40 weight percent alumina and between about 40 and about 60 weight percent silica and having impregnated thereon between about 0.01 and about 25 percent by weight of a component characterized by hydrogenation activity selected from the group consisting of oxides of metals, sulfides of metals and metals of Group VI, Group VIII and mixtures of Groups VI and VIII of the Periodic Table.

4. The catalytic composition of claim 1 wherein said component is platinum.

5. The catalytic composition of claim 1 wherein said component is nickel tungsten sulfide.

6. The catalytic composition of claim 1 wherein said component is the combined oxides of cobalt and molybdenum.

7. A method for making a hydrocracking catalyst which comprises contacting a crystalline alkali metal aluminosilicate having uniform pore openings between 6 and 15 Angstrom units with a solution of a rare earth metal compound to effect base-exchange of at least about 75 percent of the alkali metal ions of said aluminosilicate with rare earth metal ions and to reduce the alkali metal content of the resulting composite to below 4 percent by weight, washing the base-exchanged material free of soluble anions, drying and thermally activating the washed product by heating to a temperature in the approximate range of 500° F. to 1500° F. and impregnating on the resulting rare earth metal aluminosilicate a hydrogenation component selected from the group consisting of oxides of metals, sulfides of metals and metals of Group VI, Group VIII and mixtures of Groups VI and VIII of the Periodic Table.

8. A method for making a hydrocracking catalyst which comprises exchanging at least about 75 percent of the alkali metal ions of a crystalline alkali metal aluminosilicate with rare earth metal ions and impregnating on the resulting rare earth metal aluminosilicate a component characterized by hydrogenation activity selected from the group consisting of oxides of metals, sulfides of metals and metals of Group VI, Group VIII and mixtures of Groups VI and VIII of the Periodic Table.

9. A method for making a hydrocracking catalyst which comprises contacting a crystalline alkali metal aluminosilicate having uniform pore openings between 6 and 15 Angstrom units with a solution of a rare earth metal compound to effect base-exchange of at least about 90 percent of the alkali metal ions of said aluminosilicate with rare earth metal ions and to reduce the alkali metal content of the resulting composite to below 1 percent by weight, washing the base-exchanged material free of soluble anions, drying and thermally activating the washed product by heating to a temperature in the approximate range of 500° F. to 1500° F. and impregnating on the resulting rare earth metal aluminosilicate a hydrogenation component selected from the group consisting of oxides of metals, sulfides of metals and metals of Group VI, Group VIII and mixtures of Groups VI and VIII of the Periodic Table.

10. A process for hydrocracking a hydrocarbon charge by contacting the same in the presence of hydrogen under hydrocracking conditions with the catalytic composition of claim 1.

11. A process for hydrocracking a hydrocarbon charge by contacting the same in the presence of hydrogen under hydrocracking conditions with the catalytic composition of claim 2.

12. A process for hydrocracking a hydrocarbon charge by contacting the same in the presence of hydrogen under hydrocracking conditions with the catalytic composition of claim 3.

13. A process for hydrocracking a hydrocarbon charge by contacting the same in the presence of hydrogen under hydrocracking conditions with the catalytic composition of claim 4.

14. A process for hydrocracking a hydrocarbon charge by contacting the same in the presence of hydrogen under hydrocracking conditions with the catalytic composition of claim 5.

15. A process for hydrocracking a hydrocarbon charge by contacting the same in the presence of hydrogen under hydrocracking conditions with the catalytic composition of claim 6.

References Cited in the file of this patent

UNITED STATES PATENTS

| | | |
|---|---|---|
| 1,940,649 | Russell | Dec. 19, 1933 |
| 2,971,903 | Kimberlin et al. | Feb. 14, 1961 |
| 2,983,670 | Seubold | May 9, 1961 |

UNITED STATES PATENT OFFICE
CERTIFICATE OF CORRECTION

Patent No. 3,173,854                          March 16, 1965

Sylvander C. Eastwood et al.

It is hereby certified that error appears in the above numbered patent requiring correction and that the said Letters Patent should read as corrected below.

Column 2, line 22, for "VII" read -- VIII --; column 9, line 51, for "platnium" read -- platinum --.

Signed and sealed this 3rd day of August 1965.

(SEAL)
Attest:

ERNEST W. SWIDER                        EDWARD J. BRENNER
Attesting Officer                          Commissioner of Patents